US006171713B1

(12) United States Patent
Smith et al.

(10) Patent No.: US 6,171,713 B1
(45) **Date of Patent: *Jan. 9, 2001**

(54) IRON ALLOY MEMBER AND METHOD

(75) Inventors: Jerry I. Smith, Husum; Anthony E. Stout, Dallesport, both of WA (US)

(73) Assignee: Smith & Stout Research and Development, Husam, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/118,404

(22) Filed: Jul. 17, 1998

Related U.S. Application Data

(63) Continuation-in-part of application No. 08/835,109, filed on Apr. 4, 1997, now Pat. No. 6,033,791.

(51) Int. Cl.[7] .............................. B32B 15/04; B02C 1/02; B22D 19/04

(52) U.S. Cl. .......................... 428/614; 428/627; 428/681; 428/685; 164/95; 164/97; 164/108; 241/275; 241/195; 241/197

(58) Field of Search ..................................... 428/621, 627, 428/681, 685, 614; 241/195, 197, 291, 275; 148/540, 320, DIG. 148; 164/95, 97, 108, 111

(56) References Cited

U.S. PATENT DOCUMENTS

| | | | | |
|---|---|---|---|---|
| 4,119,459 | * | 10/1978 | Ekemar et al. | 75/243 |
| 4,787,564 | * | 11/1988 | Tucker | 241/275 |
| 4,796,822 | * | 1/1989 | Terrenzio | 241/275 |
| 5,007,475 | * | 4/1991 | Kennedy et al. | 164/97 |
| 5,183,518 | * | 2/1993 | Radon | 148/324 |
| 5,190,092 | * | 3/1993 | Ravankar | 164/97 |
| 5,439,535 | * | 8/1995 | Snagovski et al. | 148/544 |
| 5,533,685 | | 7/1996 | Heck | 241/275 |
| 5,765,624 | * | 6/1998 | Hathaway et al. | 164/97 |

* cited by examiner

*Primary Examiner*—Timothy M. Speer
*Assistant Examiner*—Stephen Stein
(74) *Attorney, Agent, or Firm*—Flehr Hohbach Test Allbritton & Herbert

(57) ABSTRACT

An impeller shoe (110) having a front side (112) with a series of half column members (114) and raised upper and lower rims (116, 118) that form the impact surface of the impeller shoe. Half columns (114) and raised rims (116, 118) are formed with carbide material (120) formed therein in order to improve wear resistance at these critical surfaces.

12 Claims, 7 Drawing Sheets

IRON ALLOY MEMBER AND METHOD

RELATED APPLICATION

This application is a continuation-in-part of application of Ser. No. 08/835,109, filed Apr. 4, 1997, now U.S. Pat. No. 6,033,791.

TECHNICAL FIELD

The present invention relates generally to iron alloy members with improved wear resistance and a method of making the same, and more specifically to white iron alloy members of the type employed in centrifugal impact rock crushers.

BACKGROUND ART

Wear and abrasion resistant, high impact, iron alloy members are employed in a variety of applications, in particular, in rock crushing machines for crushing rocks and ore. A common machine used for crushing rocks is a centrifugal rock crusher, such as disclosed in U.S. Pat. No. 5,533,685.

Centrifugal rock crushing apparatus typically contain cast iron impact members called impeller shoes, which throw or propel rocks against stationary members called anvils to effect crushing of the rock. Both the impeller shoes and the anvils are subjected to repeated, high force impact loading, which of course is necessary to break apart the rocks. During operation of the rock crusher, the impact surfaces, or wear faces, of the impeller shoes receive tremendous abrasion and wear, which after even a few hours of use require replacement of the shoes. Consequently, the type of material used to fabricate the impeller shoes, as well as the anvils, is of critical importance.

Replacement of impeller shoes, as well as of anvils, requires complete shut down of the machine, in order to gain access to the impeller shoes. Shut down of the rock crusher can last for 2–4 hours, in order to remove and replace the old impellers and anvils. Consequently, rapidly wearing rock crusher components significantly increases downtime and maintenance, which adds cost to the operation. Thus, it is highly desirable to provide an iron alloy member capable of withstanding high impact yet also having increased wear resistance, particularly at the wear surface.

Cast white iron alloys are economical to produce and are widely used in the rock crushing industry. White iron alloys have been found to be one of the more impact and wear resistance of the iron alloys. However, impeller shoes made from these alloys still require frequent replacement due to significant wear and abrasion. Conventional cast white iron impellers and anvils can require replacement after as little as 6–8 hours of use. The useful life of rock crusher impellers can be longer, for example, as long as 40 hours, depending upon the material being crushed, but in every case, it would be desirable to increase the life of these critical rock crusher components. Despite there drawbacks, white iron alloy impellers and anvils are, however, still the preferred choice for use in centrifugal impact rock crushers.

DISCLOSURE OF INVENTION

Briefly described, the present invention comprises a wear-resistant, high-impact iron alloy member that includes a front side, positioned to impact rocks to be crushed, which includes at least one raised portion formed of a composite material including a white iron alloy and granular carbide. The provision of carbide material within raised portions of the front impact surface of the alloy member substantially improves wear resistance of the member. Preferably, the front side includes a plurality of raised portions, each formed of a composite material including a white iron alloy and granular carbide. The plurality of raised portions form a series of half column members that receive the brunt of impact forces from the rocks. The front side includes additional raised portions, one of which is an upper rim, another of which is a lower rim, and a third of which is a raised portion between the upper and lower rims, each of which is formed of a composite material including a white iron alloy and granular carbide. This design specifically provides reinforcement at critical points on the front side of the alloy member.

The present invention also includes a method of casting a wear-resistant, high-impact, iron alloy member having at least one wear surface, comprising the steps of creating an impression in a mold that is compatible with an iron alloy material, the impression being formed in an area of the mold corresponding to the wear surface of the iron alloy member to be formed by the mold, positioning a quantity of carbide granules in the impression prior to pouring molten white iron into the mold and pouring molten white iron alloy into the mold with the carbide granules in the impression, to cast the iron alloy member with a matrix of white iron alloy and the carbide granules formed in the impression area. Preferably the mold material is made from a sand material.

According to an aspect of the method, a series of impressions are created in the mold and carbide granules are positioned in each impression prior to pouring molten white iron into the mole. The impression is defined sufficiently to contain the carbide granules as molten white iron is poured into the mold.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
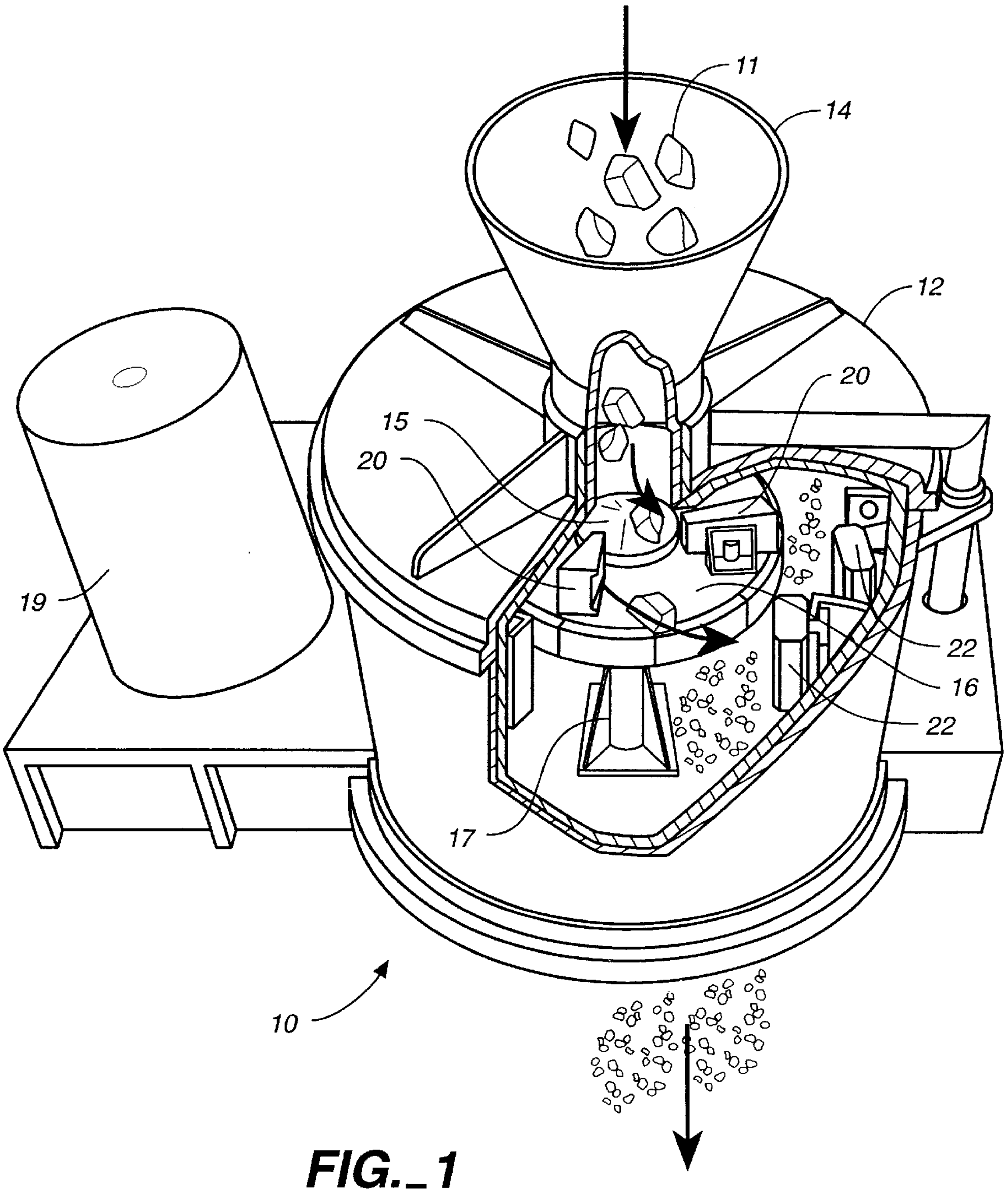
FIG. 1 is a top perspective schematic view, partially broken away, of a centrifugal impact rock crusher having impeller shoes and anvils which may be cast using the method of the present invention.

Turning to the drawings, wherein like components are designated by like reference numbers, FIG. 1 illustrates one form of a typical centrifugal impact-based rock crusher 10 which can advantageously employ iron alloy members made in accordance with the present invention. Rock crusher 10 generally includes a cylindrical housing 12, an input hopper 14 for directing materials to be crushed into housing 12, and a rotatably mounted turntable 16, having a feed cone 15 at its center. Turntable 16 is positioned about the central axis of housing 12 and hopper 14, and it is rotated by a drive shaft 17 and drive assembly including a motor 19. Attached to rotate with turntable 16 are a plurality of impeller members or elements 20, which are spaced apart around the periphery of turntable 16. A plurality of stationary anvils 22 are attached to the inside of the housing 12 and are spaced apart around the inner periphery of housing 12.

To operate the crusher, material 11, such as rock or ore, is placed in hopper 14 and drops onto feed cone 15 at the center of turntable 16. Turntable 16 is rotated at a high speed, for example, at speeds in the range of 850 to 2000 rpm, depending on the type and size of material 11 to be crushed. As table 16 turns, material 11 is directed by cone 15 outwardly toward impellers 20, which impact the rock and propel it with tremendous force toward anvils 22. As rock 11 hits both impellers 20 and anvils 22, and particularly the anvils, it is crushed or broken into pieces, which fall to a conveyor belt (not shown) below the housing.

Rock crusher components are subjected to high impact stresses. In particular, impellers 20 and anvils 22 experience great impact forces and high abrasion. Certain surfaces, i.e. the impact or wear surface, of these components are subjected to repeated impact and are susceptible to high abrasion, cracking and failure. Consequently, impact rock crusher impellers and anvils must be formed of a hard, abrasion-resistant material, yet they must also be cost effective to manufacture and operate.

Figure 2:
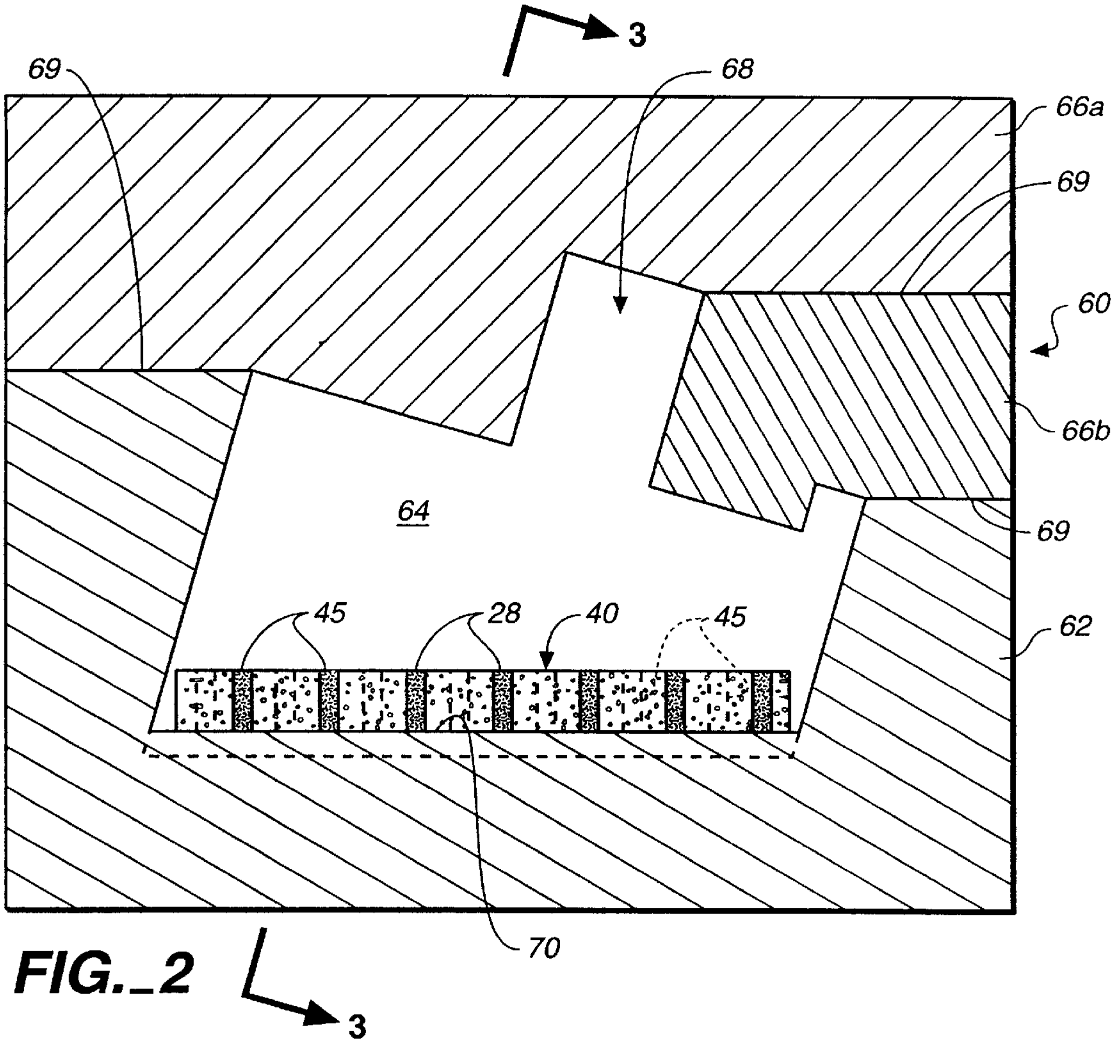
FIG. 2 is an enlarged, side elevation view of a mold, a mold cavity and a molding insert constructed in accordance with the present invention and used to make an impeller shoe of the type used in the rock crusher of FIG. 1.
Figure 3:
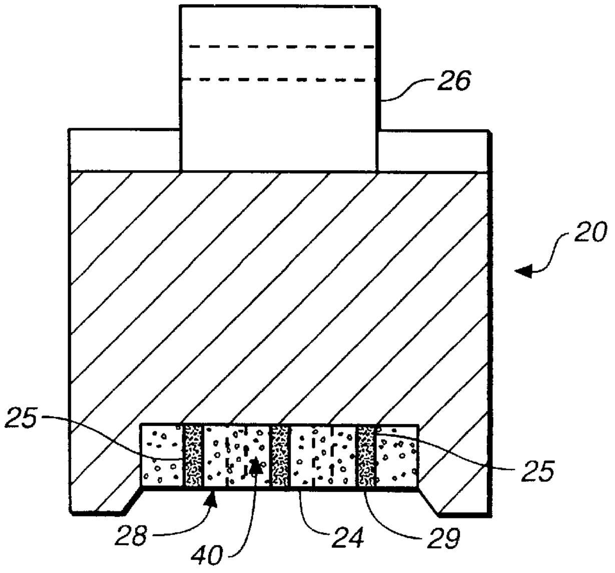
FIG. 3 is a cross-sectional view of the impeller made from the mold of FIG. 2, taken substantially along line 3—3 of FIG. 2 showing a wear-increasing particulate carbide-containing region disposed in the impeller shoe.
Figure 6:
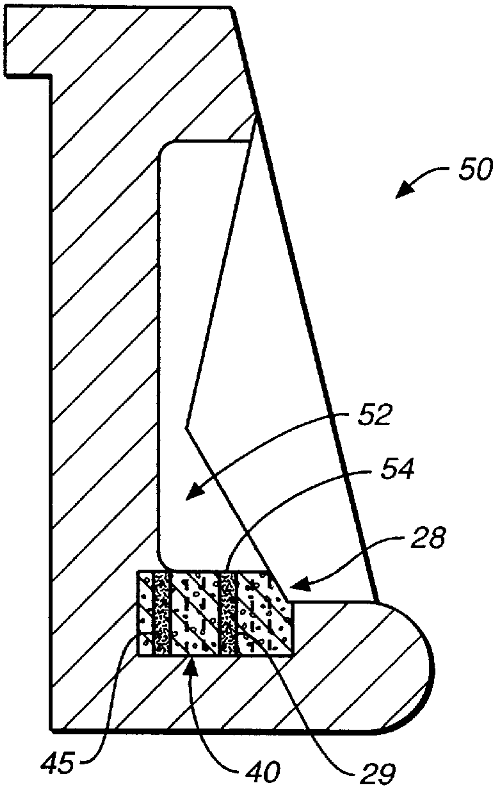
FIG. 6 is a top plan view, in cross section, of an impeller shoe made in accordance with a second embodiment of the present invention.

Of particular advantage, the present invention provides a method of casting an iron alloy member, such as a rock crusher impeller or anvil, with increased wear resistance at the region of impact and wear of the component. FIG. 3 shows one form of impeller 20 which has been made in accordance with the present invention. FIG. 2 illustrates a side elevation view of a mold assembly suitable for casting impeller 20 with a high-wear region. Specifically, impeller 20 can be seen to have a trapezoidal shape with a flat or planar, slightly recessed wear surface 24 along a sloping side of impeller 20. Opposite of the wear surface is a mounting ear 26 for attaching impeller 20 to turntable 16. The impeller as shown in FIG. 3 has a particular shape, however, the present invention may be practiced with iron alloy members of any shape. Impellers in other forms of rock crushers, for example, will have differing configurations, and one such alternative impeller configuration is shown in FIG. 6. Moreover, the iron alloy members of the present invention are particularly well suited for use in forming anvils 22 and other components in rock crushers, such as feed cones 15.

Rock crusher impellers pose problems which are particularly difficult to solve. As above noted, rock crusher turntables often rotate at 1000 to 2000 rpm. It is essential, therefore, the impeller turntable 16 be precisely balanced when the impellers are first installed, and that the turntable remains balanced as the impellers wear down during use. Uneven wear during use will force a premature shut-down of the rock crusher and replacement of the impellers.

According to the present invention, a localized and contained region of particulate carbide material 28 is disposed within the body of the iron alloy member being cast, for example, impeller 20. Preferably, as shown in FIGS. 2 and 3, the region of particulate carbide material 28 is disposed adjacent wear surface 24, where it provides a region within the cast iron alloy member which has significantly increased wear resistance.

Broadly, the use of carbides as wear-increasing materials in iron is known. Cast white iron, however, can be sensitive to the addition of carbides, which have a much higher melting temperature than iron. Silicon carbides are easier to employ as a wear-increasing material in white iron, but they also are less effective than tungsten carbide in increasing abrasion resistance. Merely mixing carbide granules, such as tungsten carbide granules with the liquid or molten white iron prior to pouring it into the mold would increase wear resistance only slightly because only a limited quantity of tungsten carbide can be added before solidification or premature hardening of the white iron would occur. Tungsten carbide is heavier than white iron while silicon carbide is lighter. Because both carbides melt at much higher melting points, they will tend to settle or float in the molten white iron in unpredictable ways. Thus, when carbides are added or mixed with molten white iron and dispersed throughout the cast member, the casting will have only a slight overall increase in wear resistance, and attempts to increase the amount of carbide used cause a degradation of the resulting cast member, with unpredictable pockets of carbide material.

It also has been found that extremely fine powders of carbide materials tend to be less effective in increasing the wear resistance of white irons than granules or larger particles of carbides. It is believed that because the carbide does not combine with the white iron in an alloying sense, a larger granule of carbide in white iron matrix raises the wear resistance to a greater degree than fine powders.

In the product and process of the present invention, therefore, carbide, and preferably tungsten carbide or silicon carbide, is used as wear increasing material, but it is concentrated and contained in the mold using a molding insert over which liquid white iron is poured. Carbide granules are placed in a molding insert which predictably controls the position of the granules in the resulting casting. The granules are then completely surrounded and encapsulated by the white iron alloy to form a matrix at a selected region of the cast member, namely, proximate a wear surface. The resulting cast product or member, therefore, has what is believed to be a matrix of white iron alloy and particles or granules of tungsten carbide or silicon carbide concentrated proximate the wear surface. The liquid white iron alloy flows around the carbide granules and completely surrounds and encapsulates them to produce a highly wear-resistant matrix.

The problem of adding tungsten carbide to cast white iron members is made more difficult for members, such as impellers, which are used in applications which require precise balancing. As will be appreciated, cast white iron alloy rock crusher impellers must be quite heavy. The entire turntable 16 is relatively massive and operates at high angular velocities. Any initial imbalance, or imbalance during impeller wear, will cause the overall turntable 16 to become imbalanced and require that the rock crusher be shut down.

Since tungsten carbide is heavier and silicon carbide is lighter than white iron, there is a tendency for the granules to migrate through the iron during casting. If the positioning of the particulate carbide in the cast member is not controlled during pouring, therefore, the resulting casting will not be balanced, or will wear in a manner which causes it to become imbalanced. Thus, in the present invention a molding insert is used to control the position of the particulate carbide material. The molding insert must be compatible with white iron alloy and yet capable of controlling the position of the carbide granules during casting. Thus, the tungsten carbide or silicon carbide must not get swept away in an unpredictable manner by flow of the molten white iron alloy into the mold, and the carbide cannot be free to migrate under gravitational influences in the molten white iron.

Turning now to FIGS. 2 and 3, more detail as to the manner in which the particulate carbide wear-resistant material can be positioned and contained within a mold during casting of a rock crusher impeller can be described. In FIG. 3, impeller 20 can be seen to have a matrix, generally designated 28, of a particulate carbide wear material distributed in white iron alloy adjacent a wear surface 24 of the impeller. Particulate carbide material 29 is distributed in matrix 28 in a plurality of columns 25, oriented substantially perpendicularly to the plane of the wear surface 24. Alternatively, carbide particles 29 may be a contained, continuous bed or mass along the wear surface, as shown and described below in connection with FIGS. 4A and 4B. The different distribution schemes depend upon the type of molding insert used to contain the carbide, and these molding inserts will be described in more detail below. While FIG. 3 shows placement of the particulate carbide region in one location, it is to be understood that wear matrix 28 may be placed at any desired location within the cast member.

Referring to FIG. 2, the present method employs a molding insert, generally designated 40, which is placed in a mold, generally designated 60. Mold 60, as shown in the drawing, is a three-part mold having a lower mold portion 62, which defines a portion of a lower mold cavity 64, and two upper mold portions 66*a* and 66*b* which define the remainder of lower cavity 64 and an upper mold cavity 68. White iron alloy mold are conventionally sand casting molds. Other mold configurations and parting lines 69 can be employed, and for simplicity, sprues and air vents are not shown.

In order to control the position of the wear-resistant particulate carbide in the resulting molded product, a molding insert 40 is placed on or positioned in mold 60. The form of molding insert used in FIG. 2 is illustrated in more detail in FIGS. 5A and 5B. When the particulate carbide is heavier than white iron, such as tungsten carbide, insert 40 is positioned immediately over a mold surface 70, which surface will produce wear surface 24 of the impeller. Molding insert 40 is formed to receive and laterally contain the particulate tungsten carbide material, which will be urged by gravity in the lighter white iron against mold surface 70. Insert 40, containing tungsten carbide, may be placed in any selected location within mold 60, but when tungsten carbide is used the location preferably is proximate a lowermost area of the mold for gravity containment and preferably is adjacent to the wear surface. Insert 40 will usually be first placed in mold cavity 64 and then filled with tungsten carbide granules while it is in the mold. The insert may be secured in the mold cavity by fasteners to hold it in place. Depending on the location of the wear surface, the insert may lie flat along the bottom of the mold, or in a vertical orientation against an outside surface. If the molding insert is not located in the mold for automatic gravity containment of the carbide granules during the pour, the insert will need to include a perforated containment wall or a wax which will hold the granules in place for a long enough period of time that they cannot gravitate away from the molding insert to a degree which is unpredictable.

Once an insert containing the particulate carbide is placed at the desired location within the mold cavity, molten white iron is poured into the mold cavity. The white iron fills the cavity, submerges the insert and flows through and around the granular carbide material to form a matrix therewith. The white iron alloy is poured at a high temperature, preferably at a temperature in the range of approximately 2700° F. to 2775° F. This temperature range is slightly higher than the conventional temperature (2550 to 2575° F.) at which white iron alloy castings are usually poured to allow for the cooling effect of the mass of the molding insert and the mass of particulate carbide material. This slightly elevated pour temperature insures even flow of the white iron into the molding insert and around the carbide granules before the iron alloy sets up.

Preferably, the white iron alloy employed in the invention is an ASTM Specification A532, class IIIA alloy, which has the following composition: 2.3 to 3.0 weight (wt) % carbon, 0.5 to 1.5 wt % manganese, up to 1.0 wt % silicon, up to 1.5 wt % nickel, 23.0 to 28.0 wt % chromium, and up to 1.5 wt % molybdenum, plus trace impurities. Most preferably, the white iron will contain a chromium content of about 25 wt percent. It is believed that the method of the present invention is also suitable for use with other cast iron alloys.

The particulate carbide material used in the method and member of the present invention is selected from the group comprising tungsten carbide and silicon carbide granules. Tungsten carbide, however, is preferred over silicon carbide since it produces a wear-resistant region in the resulting cast member which provides an improved wear life for the component.

In order to achieve the best abrasion resistance, it is further preferable that the particulate carbide have a granule nominal diameter size in the range between about 50 mesh to about ¼ inch. Most preferably the granule size is in the range of about 14 mesh to about ¼ inch. This particle range insures sufficient size of the carbide in the white iron matrix that the wear characteristics will more closely approach those of the carbide material than the white iron.

The most preferred carbide granules for use in the present invention are tungsten carbide granules having 12–18 weight percent of cobalt. These granules are preferably used in a size range of 3⁄16 to ¼ inch nominal diameter, and are known as "Impact Grade with Crushed Rounded Corners."

After the molten white iron is poured into the mold over the molding insert with particulate carbide in it, the casting preferably is heat treated. As cast, before heat treatment, the white iron will have a predominately pearlitic microstructure. Heat treating may perform a number of functions, such as, introducing new microstructure to the alloy, and making the composition more uniform, but the primary advantages are reducing internal stresses, particularly in the area of matrix 28, and increasing overall casting strength. Specifically, the casting it heated to a temperature preferably in the range of approximately 1820° F. to 1890° F. over a total time period of about 16 to about 19 hours. The casting is heated slowly in step-wise increments. Preferably the step increments are as follows: step 1 from 0 to 400° F. for 2 hours; step 2 from 400 to 800° F. for 4–5 hours, step 3 from 800 to 1200° F. for 4 hours, and step 4 from 1200 to 1890° F. for 7–8 hours.

After heat treating, the casting is cooled by using a fan or blower to blow ambient air over a mass of cast parts. The result is a cast white iron alloy part or member 20,22 having a high wear-resistant region or matrix 28 of particulate carbide contained in a selection location.

Figure 4A:
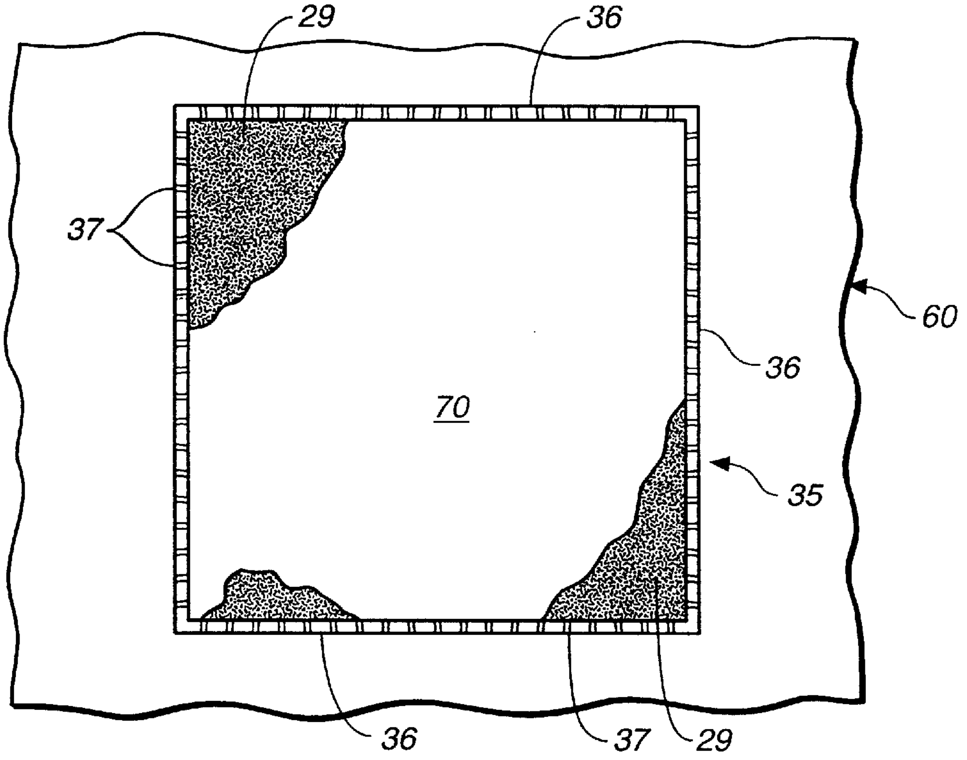
FIGS. 4A and 4B are a top plan view, and cross-sectional side elevation view, respectively, of a molding insert in accordance with one embodiment of the present invention.
Figure 4B:
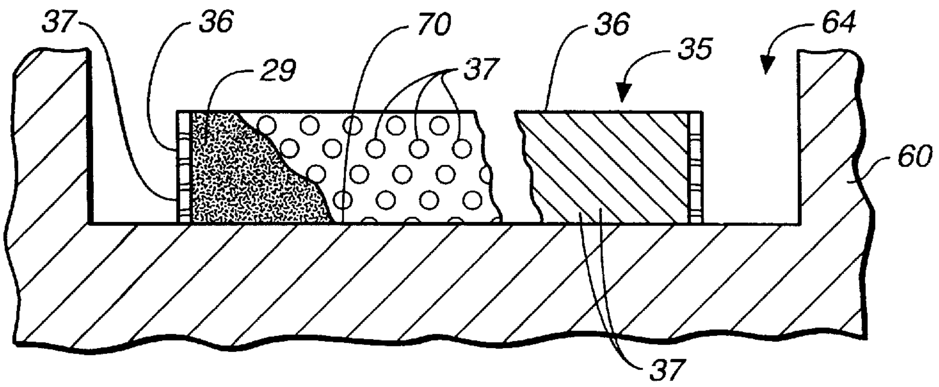
Figure 5A:
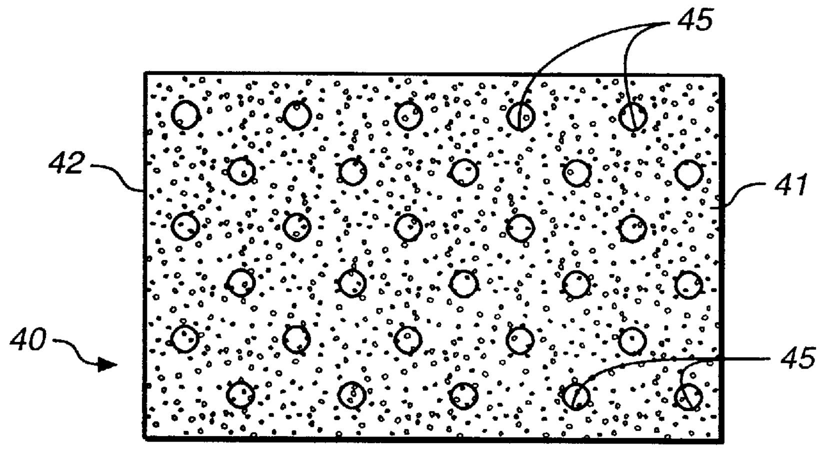
FIGS. 5A and 5B are a top plan view, and cross-sectional side elevation view, respectively, of a molding insert in accordance with an alternative embodiment of the present invention.
Figure 5B:
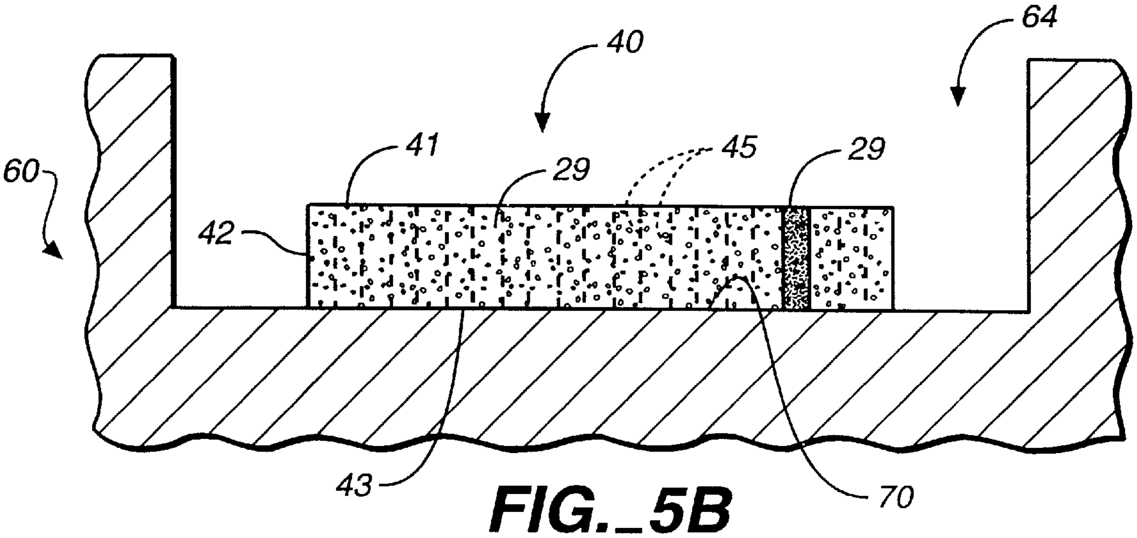

Molding insert 40 which is employed to contain the particulate carbide must be compatible with the resulting casting. As used herein, the expression "compatible" means that the molding insert must be capable of remaining in the cast member without significantly effecting its strength, impact resistance or wear resistance. One such compatible molding insert is shown in FIGS. 4A and 4B and is formed of stainless steel which melts and is absorbed into the molten white iron during casting. Another compatible molding insert is shown in FIGS. 5A and 5B and is a porous zirconium ceramic body of the type previously used in a mechanical filter for removal of impurities from molten metal alloys. This porous ceramic filter material does not dissolve in the molten white iron, but can remain embedded in the white iron and carbide matrix without significantly reducing either the impact strength or the wear resistance of the part. The insert must also be designed such that it contains the particulate carbide during the pouring and setting up of the white iron, which requires that the insert not break down too rapidly, if at all. Finally, the molding insert must allow the flow of the molten white iron rapidly into the carbide granules while they are contained so that the granules are surrounded and encapsulated by the white iron to form a relatively uniform matrix.

In FIGS. 4A and 4B a molding insert 35 is shown which is comprised of four side walls 36 that define a volume in which a bed or quantity of tungsten carbide granules 29 can be contained. Optionally, insert 35 may have a top and/or bottom surface (not shown) to provide a tray-like structure for ease of handling or for containment of the granules. As stated above, it is important that the molding insert be compatible with white iron, but it also must withstand the pour of molten white iron long enough to maintain containment of the carbide granules.

Typically, the sprue in mold 60 will be located in a position which causes the molten white iron to enter mold 60 from a side of cavity 64. Molding insert 35 is formed of a material which will melt and be absorbed in the molten white iron, but not so fast as to allow tungsten carbide granules 29 to flow with the white iron away from the wear surface. To achieve this end, in this embodiment, insert 35 is preferably comprised of stainless steel, which, of course, is a closely related metal to high chromium white iron. Most preferably insert 35 is comprised of heavy gauge stainless steel having a plurality of openings 37 which will permit the flow of white iron from the sides of the insert into the bed of tungsten carbide granules 29, as the molten white iron enters the mold from a side of cavity 64. The stainless steel walls 36 will melt when contacted by the molten metal, however, by employing a heavy gauge steel, most preferably 14 gauge steel, stainless steel insert 35 melts at a slow enough rate to keep the tungsten carbide granules from being swept away, or gravitating, from the desired region. The openings or perforations allow the molten white iron to penetrate and flow within granules in the insert. Openings 37 may be in the range of 1/16 inch to 1/8 inch diameter, with a diameter of 1/8" being preferred for granules having a nominal diameter of about 3/16 inch to about 1/4 inch. The size of the openings or perforations will vary depending on the size of the carbide granules. The perforations should be as large as possible but smaller than the diameter of the granules to resist being carried by the molten iron out of the molding insert. If a very fine grade of tungsten carbide is used, such as No. 14 mesh carbide side walls 36 of the insert 35 may be waxed to contain tungsten carbide granules 29 in the desired region. The wax will quickly melt and allow the molten iron to flow into the insert and yet will prevent excessive washing away of granules.

As the pour progresses, molten white iron also flows over the top of insert walls 36 and over the top of the exposed bed tungsten carbide granules and down into the granules. The container type of insert shown in FIGS. 4A and 4B allows the placement of a large quantity of tungsten carbide granules at the selected location within the cast member. For example, this type of molding insert would be particularly suitable for use in casting an impeller used to crush very hard material.

As shown in FIGS. 4A and 4B, molding insert 35 is placed on a lowermost surface 70 of mold 60 and the granules 29 are tungsten carbide. Thus, the greater density of the tungsten carbide relative to the white iron causes granules 29 to remain gravity biased in place in an open topped molding insert 35. If silicon carbide granules are to be used, the lesser density of such granules would require a perforated top wall on insert 35 to contain the granules against floating away during the pour. This is somewhat less desirable than tungsten carbide in that the top will slow, to some degree, flow of molten white iron over the top of the bed of granules.

It also would be possible to cast matrix 29 in an upper surface of mold 60 when silicon carbide granules are employed and provide a perforated bottom wall in insert 35.

A second embodiment of the molding insert in accordance with the present invention is shown in FIGS. 5A and 5B. The molding insert 40 is comprised of a wafer-like, porous ceramic filter material having four side surfaces 42, a top surface 41, and a bottom surface 43. Insert 40 further contains a plurality of bores 45 formed for receipt and containment of carbide granules 29. Preferably, bores 45 extend through insert 40 and are distributed relatively evenly throughout the area of the insert to form a relatively uniform pattern.

Of particular advantage, ceramic member insert 40 is also highly porous and capable of withstanding the high temperature of the molten iron, while allowing the flow of molten iron within the insert to bores 45 holding the carbide granules. Ceramic filters are widely used in the metal casting industry to mechanically remove slag from molten metals so they readily permit flow of the metal through the ceramic wafer without dissolving. Ceramic insert 40 is preferably a porous zirconia ceramic, such as filter material known as "Partially Stabilized Zirconia with Magnesia" and manufactured by Hi-Tech Ceramics, Inc. of Alfred Station, N.Y. The zirconia ceramic is not absorbed or melted during the molten iron pour, and thus the ceramic insert is retained in the resulting cast member. The porosity of the ceramic insert is preferably in the range of about 10 to about 15 pores per linear inch (ppi), with a pore size of 10 ppi being preferred.

The number and orientation of the of bores 45 in ceramic insert 40 may vary, and will generally depend upon the size of member or rock crusher component to be cast. For example, a small casting might typically employ a 3 inch by 6 inch molding insert having a height of about one inch. For this size insert 40, the diameter of the bores 45 are generally about ¼ inch and the center to center spacing of bores 45 is about ¼ inch. Preferably, bores 45 are spaced from the edges of the member 40 by about ¼ inch to ½ inch. For a larger casting, a ceramic molding insert might typically have the dimensions of 4.5 inches by 7.5 inches by 1.0 inches. For this size insert, the diameter of bores 45 are generally about ½ inch and the center to center spacing of bores 45 is about ½ inch. Preferably, bores 45 are spaced from the edges of the member 40 by about ¼ inch to ½ inch.

Bores 45 are preferably distributed throughout insert 45 in a substantially uniform manner, but they may be staggered or linear in placement. The limited area of the smaller sized molding inserts may not allow staggering. Using this molding insert design, the carbide granules are distributed substantially in a matrix of columns (i.e., bores 45), orientated substantially perpendicular to the plane of the wear surface 24. The perpendicular orientation insures even mass distribution in the cast part during wear, if the wear surfaces are oriented either perpendicular or parallel to the spin axis of turntable 16. It is important to orient and space columns or bores 45 in a manner that the resulting part will not become dynamically unbalanced in parts or components which are conventionally rotated at high spin rates.

In an alternative embodiment of ceramic wafer type insert 40, a collar or walled boundary similar to the embodiment of FIGS. 4A and 4B may be used instead of continuous wafer or plug 40. Specifically, four 1 inch thick and 1 inch high strips of zirconia ceramic may be arranged to form a collar or wall surrounding a bed of carbide granules.

When tungsten carbide granules 29 are employed the upper ends of bore 45 do not need to be waxed to prevent granule migration, but when silicon carbide granules are used, the lighter density makes it advantageous to wax closed to the upper ends of bores 45.

When either a continuous plug or a collar-type ceramic molding insert is used, molten white iron is then poured into the mold and flows within the ceramic insert 40 via the pores to encapsulate the granules of carbide material. When the pour reaches the top of the insert, molten white iron flows over the entire insert and over all of bores 45. The cast member has the ceramic insert intact in the matrix 28, and when it is removed from the mold, the presence of ceramic insert 40 in matrix 28 does not significantly effect the casting strength. The carbide granules are localized in the selected region adjacent the wear surface 24, thereby providing increased wear and abrasion resistance at the wear surface.

Ceramic molding insert 40 allows the placement of a smaller amounts of carbide within a selected location in the member or component than molding insert 35. Depending on the application, one or the other type of molding insert may be the most suitable.

To show the different applications and the different placement of the particulate carbide wear matrix 28, attention is drawn to FIG. 6. In this embodiment, an impeller 50 is provided which has a pocket depression or "scoop" 52. This type of impeller design is particularly suitable for applications where the material to be crushed contains a significant amount of dirt. At one end of the base of pocket 52 is a surface 54 which receives the greatest wear during operation, and is designated as the wear surface.

According to the present invention, impeller 50 is cast with a molding insert 55 (here shown as a porous ceramic wafer) containing particulate carbide 29. Molding insert 55 is located adjacent the wear surface 54, with the carbide granules in bores or columns 45 having a substantially vertical orientation, to provide a strengthening region of carbide material where it is most beneficial.

EXAMPLES

Impellers constructed as shown in FIGS. 2 and 3 have been cast using the method of the present invention with the following constituents:

| White iron | Tungsten Carbide | Molding Insert |
|---|---|---|
| 25 pounds | 2 pounds | ceramic wafer |
| 70 pounds | 2.5 pounds | ceramic wafer |
| 70 pounds | 3 pounds | stainless collar |
| 100 pounds | 4.5 pounds | ceramic wafer |
| 100 pounds | 5.0 pounds | stainless collar |

These impellers have been used in rock crushers and a significant increase (50 to 150%) in the service life of the impellers was achieved.

Figure 7:
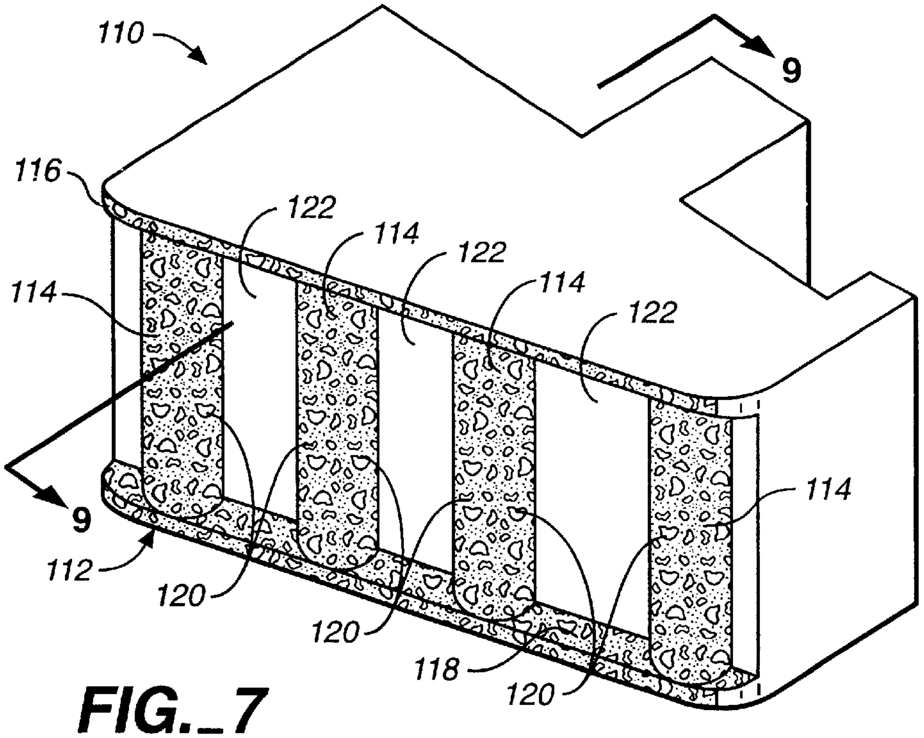
FIG. 7 is a pictorial view of an alternative, third embodiment of an impeller shoe of the present invention.
Figure 8:
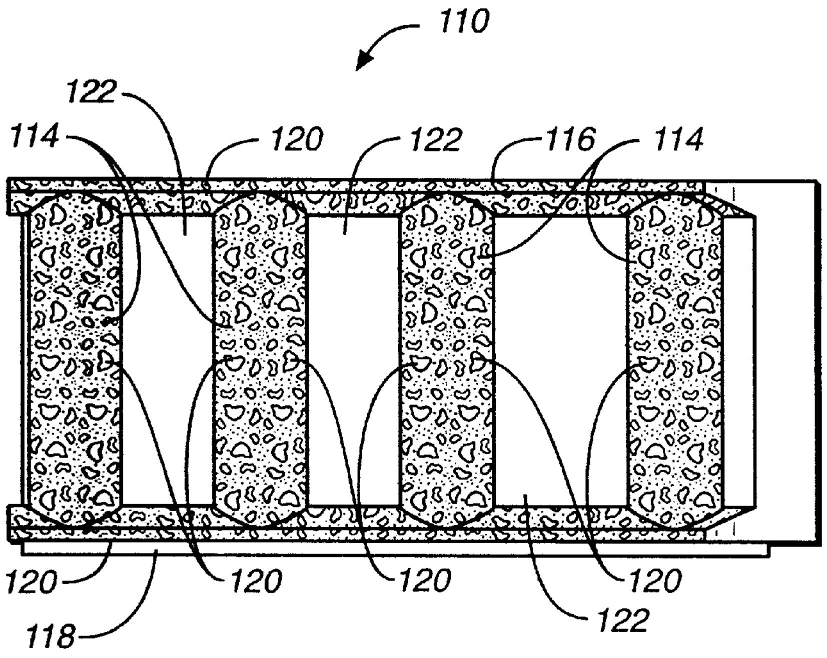
FIG. 8 is a front view of the impeller shoe of FIG. 7.

Referring to FIGS. 7 and 8, an alternative embodiment of an impeller shoe 110 is shown that has a carbon reinforced front side 112 that is designed to withstand the impact of rocks. Front side 112 includes a series of four raised portions in the form of half column members or elongated protruding ribs of semi-circular cross section 114 and an upper, raised rim 116 and a lower, raised rim 118. Ribs 114 and rims 116, 118 are formed with a dispersion of carbide granules 120 therein. The method of forming impeller shoe 110 is discussed with reference to FIG. 10.

Raised half columns or transversely extending ribs 114 and rims 116, 118 receive the brunt of rock impact forces and for this reason are reinforced with carbide material. As the turntable of the rock crusher rotates, rocks move radially outwardly into the circular path of impeller 110 and impact against front side 112, but due to the outward velocity of the rocks, are more likely to strike raised portions 114, 116, 118 rather than the flat intermediate faces 122 of front side 112. As a result, raised portions 114, 116, 118 receive the great majority of impact forces and therefore have the greatest need for carbide reinforcement.

Figure 9:
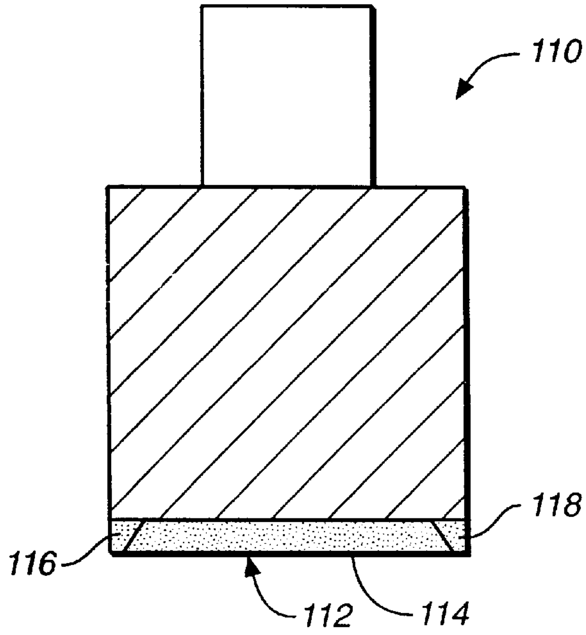
FIG. 9 is a sectional view of the impeller shoe, taken along the line 9—9 of FIG. 7.

Referring to FIG. 9, rims 116, 118 extend outwardly beyond half columns 114 and in a manner that frames half columns 114 and helps direct rocks outwardly of the impeller shoe toward the anvils. The extent or depth of the carbide material can be varied by changing the size or shape of the half column members and also by varying the volume of carbide material placed within the half column depressions in the sand mold, discussed with reference to FIG. 10.

Figure 10:
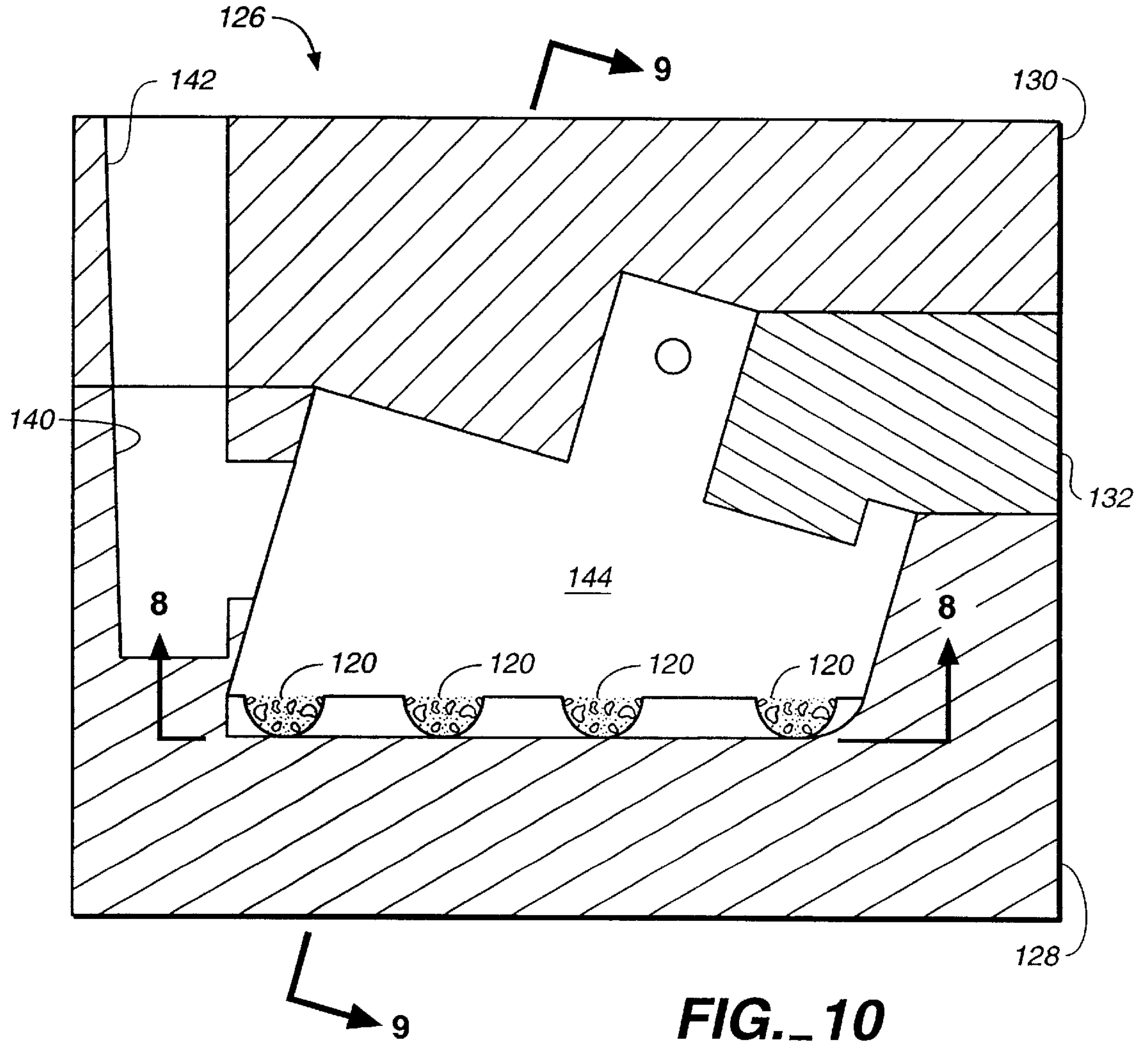
FIG. 10 is sectional view of a sand casting for making the impeller shoe of FIG. 7.

FIG. 10 illustrates a method of manufacturing the impeller shoe of this final embodiment. A three piece sand casting 126 is utilized to construct a mold for forming therein the impeller shoe. Sand casting 126 includes a base 128, a cover 130 and an insert piece 132. Base 128 includes an internal port 140 and cover 130 includes an aligned internal port 142 that together provide access to the interior cavity 144 formed by pieces 128, 130, 132. The front side of base 128 is formed from a dummy impeller shoe of the same size and shape as impeller shoe 110, including the design of half columns 114 and raised rims 116, 118. The dummy impeller shoe creates an depression of front side 112 in base piece 128. After this, carbide material 120 is placed in the depressions that correspond with the half columns and raised rims. Then molten white hot iron is poured into cavity 144 through ports 140, 142. As soon as the molten iron contacts the carbide pieces, the iron quickly cools and thereby does not tend to redistribute or otherwise relocate the carbide material.

Impeller shoe 110, made in the foregoing manner, provides a front side with improved wear resistance and is designed in such a manner that the shoe is easily manufactured. The improved design of the face of the impeller shoe limits significant wear to the carbide reinforced areas and as a result, the impeller shoe has a longer useful cycle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A wear-resistant, high-impact rock crusher member for use with an impact rock crusher having a turntable upon which a plurality of said rock crusher members are mounted to impact rocks moving generally radially on the turntable comprising:

a member body cast from a white iron alloy and having a mounting structure formed for mounting said member body to the turntable and having a front wear side for impact with rocks to be crushed, said front wear side being formed with an elongated rib protruding therefrom, said rib being oriented transversely to radial movement of the rocks impacting said front wear side when said member body is mounted to the turntable by said mounting structure, and said rib being formed of a matrix of white iron alloy and carbide granules monolithically cast with a remainder of said member body.

2. The rock crusher member as defined in claim 1 wherein, said front wear side includes a plurality of side-by-side elongated ribs each formed of a matrix of white iron alloy and carbide granules monolithically cast with the remainder of said member body, and wherein each of said ribs are oriented transversely to the radial movement of the rocks impacting said front wear side when said body member is mounted to said turntable by said mounting structure.

3. The rock crusher member as defined in claim 1 wherein, said carbide granules are tungsten carbide granules.

4. The rock crusher member as defined in claim 1 wherein, said tungsten carbide granules are impact grade with crushed rounded corners.

5. The rock crusher member as defined in claim 2 wherein, said ribs are provided by ribs having a semi-circular cross section.

6. The rock crusher member as defined in claim 1 wherein, said front wear side includes an upper rim protruding outwardly from said front wear side along an upper edge thereof when said member body is mounted to said turntable by said mounting structure, and a lower rim protruding outwardly from said front wear side along a lower edge thereof when said member body is mounted to said turntable, each of said upper rim and said lower rim being formed of a matrix of white iron alloy and granular carbide monolithically cast with a remainder of said member body.

7. The rock crusher member as defined in claim 6 wherein, said member body is cast with a plurality of transversely extending elongated protruding ribs of monolithically cast white iron alloy and carbide granules having semicircular transverse cross sections and extending between the upper and lower rims.

8. The rock crusher member as defined in claim 1 wherein, said member body is formed for use as a rock crusher impeller shoe.

9. A method of casting the wear-resistant, high-impact, rock crusher according to claim 12 having at least one wear surface, comprising the steps of:

creating an impression in a mold that is compatible with an iron alloy material, the impression being formed in an area of the mold corresponding to the wear surface of the iron alloy member to be formed by the mold, positioning a quantity of carbide granules in the impression prior to pouring molten white iron into the mold; and pouring molten white iron alloy into the mold with the carbide granules in the impression, to cast the iron alloy member with a matrix of white iron alloy and the carbide granules formed in the impression area.

10. The method of claim 9 wherein, the mold material is made from a sand material.

11. The method of claim 9 and further comprising the step of creating a series of impressions in the mold and positioning carbide granules in each impression prior to pouring molten white iron into the mole.

12. The method of claim 9 wherein, the impression is defined sufficiently to contain the carbide granules as molten white iron is poured into the mold.

* * * * *

UNITED STATES PATENT AND TRADEMARK OFFICE

CERTIFICATE OF CORRECTION

PATENT NO. : 6,171,713 B1
DATED : January 9, 2001
INVENTOR(S) : Smith, et al.

It is certified that error appears in the above-identified patent and that said Letters Patent is hereby corrected as shown below:

IN THE CLAMS:

Column 12, claim 9, line 36, please delete "claim 12" and insert therefor --claim 1--.

Signed and Sealed this

Tenth Day of July, 2001

*Attest:*

Nicholas P. Godici

NICHOLAS P. GODICI

*Attesting Officer* *Acting Director of the United States Patent and Trademark Office*